United States Patent [19]

Bothe et al.

[11] Patent Number: 4,698,261

[45] Date of Patent: Oct. 6, 1987

[54] POLYOLEFIN FILM HAVING IMPROVED MECHANICAL PROPERTIES

[75] Inventors: Lothar Bothe, Mainz-Gonsenheim; Guenther Crass, Taunusstein, both of Fed. Rep. of Germany

[73] Assignee: Hoechst Aktiengesellschaft, Frankfurt am Main, Fed. Rep. of Germany

[21] Appl. No.: 789,756

[22] Filed: Oct. 21, 1985

[30] Foreign Application Priority Data

Oct. 23, 1984 [DE] Fed. Rep. of Germany ....... 3438736

[51] Int. Cl.$^4$ ................................................ B32B 3/00
[52] U.S. Cl. ..................... 428/204; 428/332; 428/349; 428/352; 428/516; 428/518
[58] Field of Search ............... 428/516, 518, 404, 349, 428/332, 352, 343, 204, 206

[56] References Cited

U.S. PATENT DOCUMENTS

| | | | |
|---|---|---|---|
| 4,239,822 | 12/1980 | McGee | 428/511 |
| 4,303,708 | 12/1981 | Gebhardt et al. | 428/35 |
| 4,377,616 | 3/1983 | Ashcraft et al. | 428/213 |
| 4,522,887 | 6/1985 | Koebisu et al. | 428/516 |
| 4,526,823 | 7/1985 | Farrell et al. | 428/516 |
| 4,608,284 | 8/1986 | Roales | 428/516 |

FOREIGN PATENT DOCUMENTS

| | | | |
|---|---|---|---|
| 0079520 | 5/1983 | European Pat. Off. | |
| 2521532 | 8/1983 | France | 424/204 |

*Primary Examiner*—Edith Buffalow
*Attorney, Agent, or Firm*—Schwartz, Jeffery, Schwaab, Mack, Blumenthal & Evans

[57] ABSTRACT

An opaque polyolefin film having a three-layer support film and transparent or clear polyolefin covering layers which cover the two surfaces of the support film. In the support film, either the inner layer or the two intermediate layers arranged between the inner layer and the covering layers are composed of a filler-free polyolefin which is modified with a natural or synthetic resin having a softening point ranging from 70° C. to 180° C. The respective non-modified polyolefin layer or layers of the support film have a filler and exhibit a vacuole structure which produces a relatively low density film of less than 0.9 g/cm$^3$. The production of the opaque polyolefin film comprising five layers is carried out by coextrusion and biaxial stretching, followed by heat setting the coextruded film. The film is advantageously used for packaging purposes.

14 Claims, No Drawings

POLYOLEFIN FILM HAVING IMPROVED MECHANICAL PROPERTIES

BACKGROUND OF THE INVENTION

The present invention relates to a coextruded and biaxially stretched, opaque polyolefin film having improved mechanical properties, which comprises a filler-containing opaque polyolefin support film and two transparent or clear polyolefin covering layers which cover the two surfaces of the support film. The invention also relates to a process for the production of such films and to the use thereof.

U.S. Pat. Nos. 4,303,708 and 4,377,616 both disclose a coextruded and biaxially stretched, opaque polyolefin film which comprises an opaque support film and two transparent or clear outer layers (covering layers). The support film which has a considerably greater thickness compared with the covering layers, is a monolayer film and comprises a polyolefin and fillers. The opacity of the support film results from the fact that, owing to the filler content and biaxial stretching, a great number of voids (vacuoles) are present. In the stretching operation, the polymer matrix is torn open at the grain boundaries of the inorganic or organic fillers which are incompatible with the polyolefin, such that the above-indicated vacuoles, i.e. free (empty or unfilled) spaces, are formed. It is a matter of course that these vacuoles or micro-cavities are distributed throughout the volume of the support film. The refraction (scattering) of light at the voids imparts an extremely attractive opaque appearance to the film. Since these multi-layer polyolefin films are especially used in the field of packaging, it would be advantageous for them to also possess good mechanical properties. However, in this respect the films are still unsatisfactory. This applies, in particular, to opaque polyolefin films of low density, i.e. having a density of less than 0.9 g/cm$^3$.

From published European Patent Application No. 0,079,520 it is, moreover, known to use so-called hard resins which comprise natural or synthetic resins of various types having softening points of at least 70° C., as additives in polyolefins. The resin-modified polyolefin films described in this publication concern light-transmitting, rather than opaque films.

SUMMARY OF THE INVENTION

It is accordingly an object of the present invention to provide an opaque polyolefin film, which, in addition to an attractive appearance, has good mechanical properties.

It is another object of the invention to provide an opaque polyolefin film which, in particular, has a high modulus of elasticity in the longitudinal direction.

These objects are achieved by an opaque polyolefin film, comprising a multilayer polyolefin support film, and a transparent or clear polyolefin covering layer covering each side of the support film, the support film including an inner layer, and a separate intermediate layer covering each side of the inner layer, either the inner layer or both the intermediate layers containing a filler in an amount sufficient to impart a pearlescent luster to the polyolefin film when the polyolefin film is biaxially oriented. The filler-free layer or layers of the support film contain a polyolefin modified with either a natural or a synthetic resin, the resin having a softening point ranging from about 70° C. to about 180° C.

The objects of the invention are also achieved by a process for producing a biaxially stretched, opaque polyolefin film comprising the steps of coextruding a plurality of polyolefin melts through a flat sheet die to form a multilayered polyolefin film, cooling the polyolefin film to effect solidification, stretching the polyolefin film from about 5 to about 7 fold in the longitudinal direction, and from about 8 to about 10 fold in the transverse direction, the polyolefin film thereby being biaxially oreinted, and heatsetting the biaxially oriented polyolefin film. The polyolefin film is longitudinally stretched in at least a first step at a temperature of from about 120° C. to about 130° C.

DETAILED DESCRIPTION OF THE PREFERRED EMBODIMENTS

The support film of the polyolefin film is composed of three layers, in which either the inner layer (A) or the two intermediate layers (B and C) arranged between the inner layer (A) and covering layers (D and E) comprise a filler-free polyolefin which is modified with a natural or synthetic resin having a softening point ranging from about 70° to 180° C., preferably from 80° to 140° C., while the filler is present in the other layer or layers of the support film which do not contain this resin. The softening point is determined according to the Vicat-A method of measurement (DIN 53460). In this method, a needle having a flat end of 1 mm$^2$ is placed on the test specimen under a load of 1 kg. The specimen is heated at a rate of 50° C./hour and the temperature at which the needle has penetrated the specimen to a depth of 1 mm is measured.

According to the invention, the amount of resin added for modifying the polyolefin is generally from about 1 to about 30 percent by weight, preferably from about 5 to about 20 percent by weight, relative to the polyolefin.

In a particular, preferred embodiment of the opaque polyolefin film according to the present invention, the three layers of the support film are built up in such a way that the inner layer (A) comprises a polyolefin and from about 1 to about 30 percent by weight, preferably from about 5 to about 20 percent by weight, relative to the polyolefin, of the indicated resin. The two intermediate layers (B and C) comprise a polyolefin and from abou 3 to about 30 percent by weight, preferably from about 10 to about 20 percent by weight, relative to the polyolefin, of a filler having a particle size of from about 0.1 to about 20 μm, preferably from about 1 to about 10 μm.

In another particularly preferred embodiment, the three layers of the support film are composed in such a way that the inner layer (A) comprises a polyolefin and from about 3 to about 30 percent by weight, preferably from about 10 to about 20 percent by weight, relative to the polyolefin, of a filler having a particle size of from about 0.1 to about 20 μm, preferably from abou 1 to about 10 μm and the two intermediate layers (B and C) comprise a polyolefin and from about 1 to about 30 percent by weight, preferably from about 5 to about 20 percent by weight, relative to the polyolefin, of the indicated resin. Of these two embodiments, the first-mentioned embodiment is preferred, since it exhibits particularly good mechanical properties, especially a high modulus of elasticity.

The polyolefin used in the opaque polyolefin film of the present invention, which totally comprises five layers, may be an olefin homopolymer, an olefin copolymer or a mixture thereof. As a rule, the polyolefins are homopolymers and copolymers of alpha-olefins containing from 2 to 8 carbon atoms, preferably from 2 to 4 carbon atoms. Preferred polyolefins comprise propylene homopolymers, propylene copolymers (block copolymers or random copolymers), preferably copolymers containing a comonomer proportion of up to about 20 percent by weight, the comonomer preferably being ethylene and/or butene-1, or mixtures of these polymers. The polyolefin used in layers A, B and C advantageously comprises a propylene homopolymer, an isotactic polypropylene being preferred. The polyolefin used in the covering layers D and E advantageously comprises a propylene copolymer containing ethylene and/or butene-1 as comonomers, preferably in an amount of up to about 20 percent by weight, particularly of up to about 5 percent by weight, relative to the copolymer.

The natural or synthetic resins which are added to modify the polyolefin comprise the so-called hard resins known in the art. These include, for example, hydrocarbon resins, such as coumarone resins, petroleum resins and terpene resins, ketonic resins, polyamide resins, aldehyde resins, such as xylene-formaldehyde resins and naphthalene-formaldehyde resins, dammar resins and colophony.

Coumarone resins are usually obtained by the polymerization of fractions of coal tar light oil, which have been dephenolized and freed from bases and contain, for example, indene, styrene, dicyclopendadiene, coumarone and the homologues thereof, as unsaturated compounds. By copolymerization, for example with phenol, many modifications are possible.

The raw material bases of petroleum resins are obtained in the cracking of naphtha or gas oil into raw materials for the chemical industry, for example, ethylene and propylene. These include, for example, resin-forming compounds, such as butene, butadiene, pentene, piperylene, isoprene, cyclopentadiene, dicyclopentadiene, alkylbenzenes, methyl-dicyclopentadiene, methylindene, naphthalene, styrene, indene, vinyltoluene, and methylstyrene.

Terpene resins comprise polymers of terpenes. Examples of suitable terpenes are beta-pinene, dipentene, limonene, myrcene, camphene and similar terpenes.

The hydrocarbon resins may be modified, for example, by reacting the raw materials prior to polymerization, by introducing special monomers, or by reacting the polymerized product. A preferred type of modification is the hydrogenation or partial hydrogenation of unsaturated components of the resins.

Dammar resins are obtained by tapping living trees of the family Dipterocarpaceae.

Colophony is a natural resin which is derived from the crude balsam of conifers (balsamic resin), the extract of conifer stubs (wood resin), or from tall oil (tall resin) and substantially comprises abietic acid and the isomers thereof. Modified colophony is also included, which is produced by polymerizing, hydrogenating, dehydrogenating, oxidizing, decarboxylizing, saponifying, esterifying, isomerizing or disproportionating colophony.

Preferred resins comprise styrene polymers, alpha-methylstyrene/styrene copolymers, alpha-methylstyrene/vinyltoluene copolymers, hydrogenated alpha-methylstyrene/vinyltoluene/indene copolymers, pentadiene polymers, hydrogenated cyclopentadiene polymers, alpha-pinene polymers or beta-pinene polymers, terpene polymers, colophony, and modified colophony.

The fillers comprise customary, preferably inorganic pulverulent materials which are incompatible with polyolefins. Suitable fillers are aluminum oxide, aluminum sulfate, barium sulfate, calcium carbonate, magnesium carbonate, silicates such as aluminum silicate (kaolin), magnesium silicate (talcum), silicon dioxide and/or titanium dioxide. Of these, barium sulfate, calcium carbonate, silicon dioxide, titanium dioxide, or mixtures thereof are preferably used. Calcium carbonate (chalk) is a particularly preferred filler. The (average) particle size of the pulverulent filler is in the range from 0.1 to 20 $\mu$m, preferably from 1 to 10 $\mu$m.

In addition to polyolefin, resin, and filler, the individual layers of the opaque polyolefin film of the present invention may contain appropriate additives, such as dyes, stabilizers, antioxidants, antistatic agents and/or other agents for special finishes, each of which is present in an effective quantity. According to a preferred embodiment, the two covering layers (D and E), which may comprise the same or, in each case, a different polyolefin, include an anti-blocking agent. According to another preferred embodiment, one of the two covering layers comprises an adhesive agent with respect to adhesives, such as rubber and acrylate adhesives, and the other covering layer comprises a releasing agent.

Suitable adhesive agents with respect to adhesives, particularly with respect to rubber and acrylate adhesives, include the above-indicated natural or synthetic resins. Suitable anti-adhesive agents include poly-diorganosiloxanes. If a poly-diorganosiloxane layer is applied, it is appropriate to subject this layer to a gas discharge treatment. According to another preferred embodiment, one of the two covering layers which appropriately comprises an adhesive agent with respect to adhesives, is coated with an adhesive layer, preferably with a layer comprising a rubber or acrylate adhesive. In a particularly preferred embodiment, the two covering layers are heat-sealable.

The five-layer, opaque polyolefin film according to the present invention has a thickness (total thickness) ranging from about 10 to 80 $\mu$m, preferably from 20 to 60 $\mu$m. To achieve a very high modulus of elasticity, the thicknesses of the layers, particularly the thicknesses of the three layers forming the support film, should have a particular ratio with respect to each other. Preferably, the thickness of the inner layer (A) should be from 30 to 60% of the total thickness, the sum of the thicknesses of the two intermediate layers (B and C) from 30 to 60%, and the sum of the thicknesses of the two covering layers (D and E) from 2 to 10% of the total thickness. The two intermediate layers (B and C) can have different thicknesses, but they are preferably equally thick. The same applies to the two covering layers (D and E), each of which preferably has a thickness from 0.5 to 2 $\mu$m, such that, in a preferred embodiment, the film is symmetrically constructed.

Due to the vacuole structure of the layer containing the filler particles, the polyolefin film of the present invention has a density of less than 0.9 g/cm$^3$, preferably less than 0.7 g/cm$^3$ and, in particular, less than 0.6 g/cm$^3$. The vacuole structure also produces the pearlescent luster of the film, which is particularly pronounced when the vacuole structure is present in the inner layer of the support film.

The process of making the polyolefin film is characterized in that the melts corresponding to the individual layers of the film are coextruded through a flat sheet die; the film obtained by coextrusion is cooled to effect solidification. The film is stretched five to seven-fold in the longitudinal direction and eight to ten-fold in the transverse direction, and the biaxially oriented film is heat set. Longitudinal stretching is carried out at least once and the temperature of the film during the first longitudinal stretching operation is up to 20° C. below the temperature which is customarily used in the stretching of a clear film comprising the same material.

The production of the multi-layer, opaque polyolefin films of the present invention is thus carried out according to the coextrusion process which is known per se.

In this process, the polymers or polymer mixtures of the individual layers are liquefied and compressed in an extruder. Then the melts are simultaneously extruded through a flat sheet die (slot die) and the extruded multilayer film is cooled and solidified by passing it over one or several rolls which are maintained at a temperature of from about 30° C. to about 50° C. by cooling. The film thus obtained is then stretched in the longitudinal and transverse directions relative to the direction of extrusion, at a temperature which is below the melting point of the polymer used, whereby the molecular chains are oriented. The ratio (total ratio) of stretching according to the present invention is from about 5:1 to about 7:1 in the longitudinal direction and from about 8:1 to about 10:1 in the transverse direction. The first longitudinal stretching operation is preferably carried out at a film temperature ranging from about 120° C. to about 130° C. and the optional further longitudinal stretching operations as well as transverse stretching are preferably carried out at a film temperature ranging from about 160° C. to about 170° C. Biaxial stretching can be performed simultaneously or successively (first longitudinally and then transversely, or vice versa). It is preferred to carry out stretching in three steps according to one of the following sequences:
longitudinal - transverse - longitudinal,
longitudinal - longitudinal - transverse,
longitudinal - simultaneous (longitudinal/transverse), or
simultaneous (longitudinal/transverse) - longitudinal, the sequence longitudinal - transverse - longitudinal being particularly preferred. Longitudinal stretching is appropriately effected with the aid of two rolls running at different speeds corresponding to the desired stretching ratio, while transverse stretching is effected with the aid of a corresponding tenter frame. Biaxial stretching of the film is followed by heat-setting (heat treatment). Heat-setting is likewise carried out in a manner known per se, i.e. the film is maintained at a temperature from about 150° to about 160° C., for a period of from about 0.5 to about 10 seconds, preferably from 1 to 5 seconds. The heat-set film is cooled by passing it over chill rolls, as is customary and it is wound up with the aid of a take-up device.

The opaque polyolefin film according to the present invention is advantageously used in all applications, where a high modulus of elasticity and, if appropriate, also a low density are required. It is preferably used for packaging purposes, in particular as a substitute for paper, i.e. in the field of paper packaging, and as a base film for an adhesive tape.

Below the invention is explained in detail with reference to illustrative examples.

EXAMPLE 1

An opaque polyolefin film comprising five layers was co-extruded through a flat sheet die. In detail the polyolefin film was formed of a three-layer support film and two outer covering layers (D and E). The three layers of the support film comprised an inner layer (A) and two intermediate layers (B and C) between the inner layer (A) and the two covering layers (D and E). The five melts A to E which were coextruded and corresponded to the above-indicated five layers had the following compositions:

Melt A comprised polypropylene (isotactic) and 15% by weight, relative to the polypropylene, of the synthetic resin comprising an alpha-methylstyrene/styrene copolymer having a softening point of 130° C.

Each of the melts B and C comprised a polypropylene (identical to that of melt A) and 15% by weight, relative to the polypropylene, of calcium carbonate having an average particle size of 5 $\mu$m.

Each of the melts D and E comprised a heat-sealable propylene copolymer (random) containing 4% by weight of ethylene, relative to the copolymer.

The temperature of the melts was 270° C., in each case (coextrusion temperature). After cooling the coextruded five-layer film on a chill roll at a temperature of about 30° C., the film was longitudinally stretched at 125° C. by a factor of 6 and thereafter transversely stretched at 165° C., by a factor of 9. The following heat-setting operation was carried out at 160° C. for five seconds.

The opaque five-layer polypropylene film thus obtained had a thickness of 40 $\mu$m and a density of 0.65 g/cm$^3$.

The individual layers had the following thicknesses:
Layer A: 18 $\mu$m
Layers B and C: 10 $\mu$m each
Layers D and E: 1 $\mu$m each The modulus of elasticity in the longitudinal direction of the film was 2,400 N/mm$^2$.

EXAMPLE 2

As in Example 1, an opaque polyolefin film comprising five layers was coextruded (layers A to E), biaxially stretched and heat set.

The five melts A to E used in the coextrusion process and corresponding to the above-indicated five layers had the following compositions:
Melt A comprised a polypropylene (isotactic) and 15% by weight, relative to the polypropylene, of calcium carbonate having an average particle size of 5 $\mu$m.
Each of the melts B and C comprised a polypropylene (identical to that of melt A) and 15% by weight, relative to the polypropylene, of the synthetic resin comprising an alpha-methylstyrene/styrene copolymer having a softening point of 130° C.
Each of the melts D and E comprised a heat-sealable propylene copolymer (random) containing 4% by weight of ethylene, relative to the copolymer.

The opaque five-layer polyolefin film obtained had a thickness of 40 $\mu$m and a density of 0.65 g/cm$^3$. The individual layers had the following thicknesses:
Layer A: 18 $\mu$m
Layers B and C: 10 $\mu$m each
Layers D and E: 1 $\mu$m each.

The modulus of elasticity in the longitudinal direction of the film was 2,400 N/mm$^2$.

What is claimed is:
1. An opaque polyolefin film, comprising:
a multilayer polyolefin support film; and
two transparent or clear polyolefin covering layers, one of said covering layers covering each side of said support film;

said support film including an inner layer, and two separate intermediate layers, one intermediate layer covering each side of said inner layer, wherein at least one of said layers of said support film contains a filler in an amount sufficient to impart a pearlescent luster to said polyolefin film when said polyolefin film is biaxially oriented, and wherein at least one other layer of said support film comprises a polyolefin modified with one of a natural and a synthetic resin, said resin having a softening point range from about 70° C. to about 180° C.

2. A polyolefin film as claimed in claim 1, wherein said inner layer contains said resin in an amount of from about 1% to about 30% by weight of the polyolefin in said inner layer, and wherein said intermediate layers each contain said filler in an amount of from about 3% to about 30% by weight of the polyolefin in each said intermediate layer, said filler having a particle size of from about 0.1 μm to about 20 μm.

3. A polyolefin film as claimed in claim 1, wherein said inner layer contains said filler in an amount of from about 3% to about 30% by weight of the polyolefin in said inner layer, said filler having a particle size of from about 0.1 μm to about 20 μm, and wherein said intermediate layers each contain said resin in an amount of from about 1% to about 30% by weight of the polyolefin in each said intermediate layer.

4. A polyolefin film as claimed in claim 1, wherein the polyolefin of said support film and said covering layers is selected from the group consisting of an alpha-olefin homopolymer and a copolymer of alpha-olefin, the alpha-olefin having from 2 to 8 carbon atoms.

5. A polyolefin film as claimed in claim 1, wherein the polyolefin of said support film comprises a propylene homopolymer, and the polyolefin of said covering layers comprises a propylene copolymer having a comonomer selected from the group consisting of ethylene, butene-1, and mixtures thereof, said comonomer being present in a quantity of up to about 20% by weight of said copolymer.

6. A polyolefin film as claimed in claim 1, wherein said resin is selected from the group consisting of a styrene polymer, an alpha-methylstyrene/styrene copolymer, an alpha-methylstyrene/vinyltoluene copolymer, a hydrogenated alpha-methylstyrene/vinyltoluene/indene copolymer, a pentadiene polymer, a hydrogenated cyclopentadiene polymer, an alpha-pinene polymer, a betapinene polymer, a terpene polymer, colophony and a modified colophony.

7. A polyolefin film as claimed in claim 1, wherein said filler is selected from the group consisting of barium sulfate, calcium carbonate, silicon dioxide and titanium dioxide.

8. A polyolefin film as claimed in claim 1, wherein said polyolefin film has a thickness of from about 10 to about 80 μm, the thickness of said inner layer being from about 30 to about 60% of the total thickness, the sum of the thicknesses of the two intermediate layers being from about 30 to about 60% of the total thickness, and the sum of the thicknesses of the two covering layers being from about 2 to about 10% of the total thickness.

9. A polyolefin film as claimed in claim 1, wherein said polyolefin film has a density of less than about 0.7 g/cm$^3$.

10. A polyolefin film as claimed in claim 1, wherein said covering layers each include an antiblocking agent.

11. A polyolefin film as claimed in claim 1, wherein one of said covering layers includes an adhesive agent, and the other of said covering layers includes a releasing agent.

12. A paper substitute comprising the polyolefin film as claimed in claim 1.

13. A base film for an adhesive tape comprising the polyolefin film as claimed in claim 1.

14. An opaque polyolefin film, comprising:
a multilayer polyolefin support film; and
two transparent or clear polyolefin covering layers, one of said covering layers covering each side of said support film;
said support film including an inner layer and two separate intermediate layers, one intermediate layer covering each side of said inner layer;
wherein either said inner layer or said intermediate layers contains a filler in an amount sufficient to impart a pearlescent luster to said polyolefin film when said polyolefin film is biaxially oriented; and
wherein said inner layer or said intermediate layers not containing said filler comprises a polyolefin modified with either a natural or a synthetic resin having a softening point of from about 70° C. to about 180° C.

* * * * *